the(12) United States Patent
Kowalski

(10) Patent No.: US 11,878,660 B2
(45) Date of Patent: Jan. 23, 2024

(54) ARTICULATED ROLLER ASSEMBLY FOR BENT BAR

(71) Applicant: Suspenz, Inc., Atlanta, GA (US)

(72) Inventor: Ian Kowalski, Roswell, GA (US)

(73) Assignee: Suspenz, Inc., Atlanta, GA (US)

(*) Notice: Subject to any disclaimer, the term of this patent is extended or adjusted under 35 U.S.C. 154(b) by 52 days.

(21) Appl. No.: 17/462,761

(22) Filed: Aug. 31, 2021

(65) Prior Publication Data

US 2023/0062404 A1 Mar. 2, 2023

(51) Int. Cl.
B60R 9/08 (2006.01)

(52) U.S. Cl.
CPC ..................... B60R 9/08 (2013.01)

(58) Field of Classification Search
CPC ........................................ B60R 9/08
USPC ........................................ 224/309
See application file for complete search history.

(56) References Cited

U.S. PATENT DOCUMENTS

| | | | |
|---|---|---|---|
| 2,325,762 A | 8/1943 | Ford | |
| 2,469,987 A * | 5/1949 | Pilsner | B60P 3/1025 224/310 |
| 2,885,102 A * | 5/1959 | Duncan | B60P 3/1025 224/310 |
| 3,170,583 A * | 2/1965 | Meyer | B60P 3/1025 224/310 |
| 3,826,390 A | 7/1974 | Watson | |
| 4,210,235 A | 7/1980 | Johnson | |
| 4,390,117 A | 6/1983 | Fagan | |
| 4,603,459 A | 8/1986 | Buchanan | |
| 4,896,758 A | 1/1990 | Hoszowski | |
| 5,024,312 A | 6/1991 | Godbersen | |
| 5,951,231 A | 9/1999 | Allen | |
| 5,957,350 A | 9/1999 | Giles | |
| 9,156,410 B2 * | 10/2015 | Wang | B60R 9/045 |
| 9,346,409 B2 * | 5/2016 | Pfaeffli | B60R 9/045 |
| 9,969,335 B2 * | 5/2018 | Putnam | B60R 9/042 |
| 10,322,662 B2 * | 6/2019 | Lasley | B63C 13/00 |
| 11,192,489 B2 * | 12/2021 | Dworkin | B63C 15/00 |
| 11,679,724 B2 * | 6/2023 | Dayani | B60R 9/052 224/309 |
| 2005/0077335 A1 | 4/2005 | Bourne | |
| 2005/0082325 A1 | 4/2005 | Bourne | |

* cited by examiner

Primary Examiner — Peter N Helvey
(74) Attorney, Agent, or Firm — Lee & Hayes, P.C.

(57) ABSTRACT

An articulated roller assembly for a bent bar comprising an articulated roller configured to spin relative to the bent bar. The bent bar generally comprises at least one bent portion and at least one straight portion. The articulated roller is designed to be fitted over the bent portion of the bar to be positioned on the at least one straight portion of the bar where it spins freely. The articulated rollers comprise a series of cylindrical rigid bushings surrounded by a flexible, deformable sleeve. The bushings have an inner diameter and length such that the articulated roller can be fitted over the bent portion of the bar. In some examples, the inner diameter and length of the bushings are a function of the outer diameter of the bent bar and the radius of the bend in the bent portion of the bar.

20 Claims, 5 Drawing Sheets

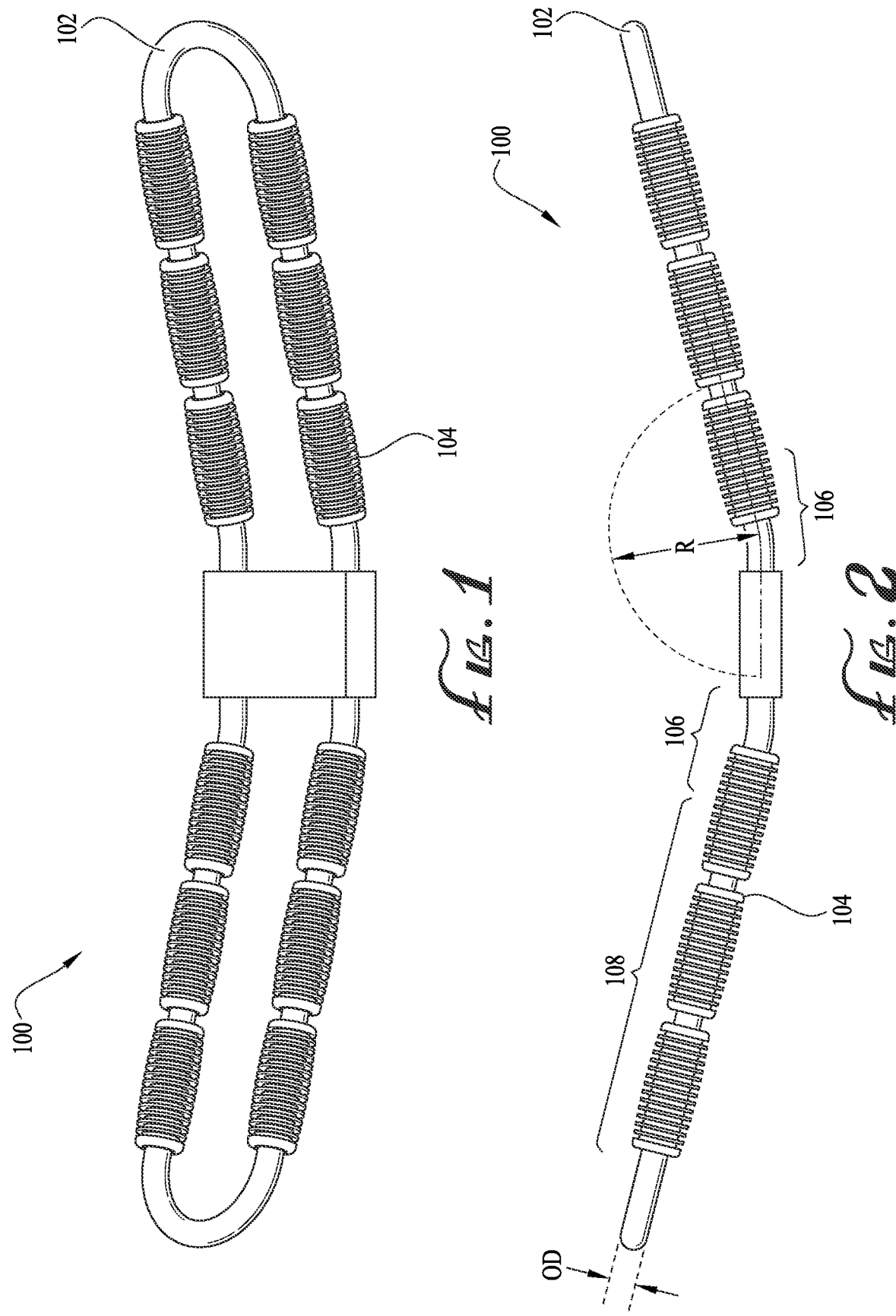

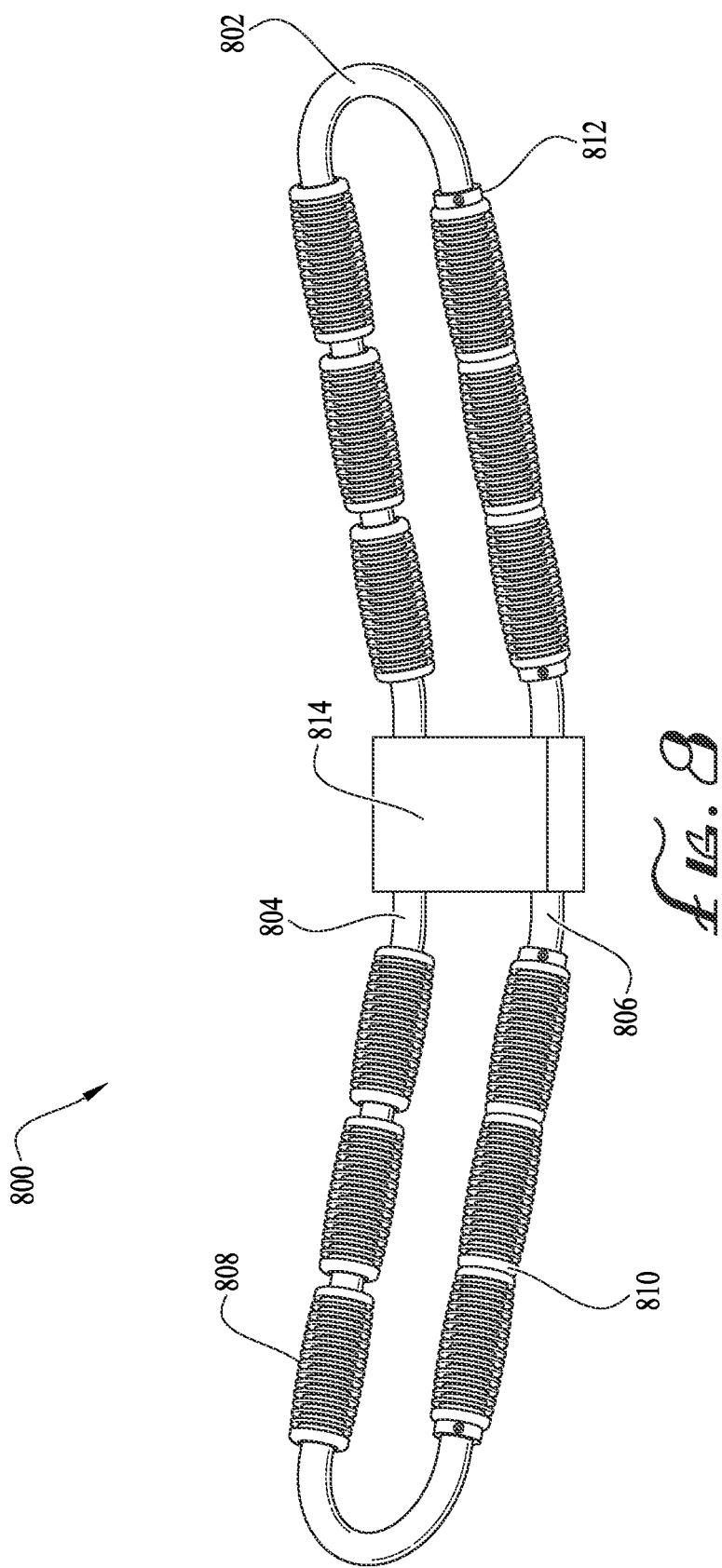

ARTICULATED ROLLER ASSEMBLY FOR BENT BAR

TECHNICAL FIELD

The present invention relates generally to the field of transporting devices for payloads, and more particularly to an articulated roller assembly for a bent bar.

BACKGROUND

The paddle sports industry includes watercraft such as canoes, kayaks, and stand-up paddleboards (SUP). These watercraft often need to be transported and are too large to fit within most vehicles. Therefore, watercraft are often transported on top of a vehicle using a roof rack. A roof rack is one or more mounting elements or bars attached to the roof of a vehicle to support and restrain cargo, such as a watercraft. Given the irregular size and shape of most watercraft, and other cargo, the bars of a roof rack are ideally a V-shape or U-shape, such that the bars of the rack are bent.

Previous roof racks required watercraft to be lifted up and over the roof of the vehicle and set onto the mounting elements. Given the weight of many watercraft, this endeavor often requires multiple people. To make loading and unloading more efficient, the mounting system can include rotating elements, i.e., elements that rotate about an axis transverse to the watercraft-loading direction, so that watercraft can move lengthwise along the vehicle roof during loading and unloading. The rotating elements generally include rigid materials to facilitate rotation around mounting elements or bars. However, the rigid portion of rotating elements were not dimensioned to fit around the bends in the V-shaped or U-shaped roof rack. Designing bent roof racks with rollers that cannot fit around the bends in the roof rack increases the time and expense of manufacture. Therefore, a need exists for a rolling element that can be fit over the bend in a roof rack bar.

It is to the provision of an articulated roller assembly for a bent bar meeting these and other needs that the present invention is primarily directed.

SUMMARY

In example embodiments, the present invention provides an articulated roller assembly for a bent bar comprising an articulated roller configured to spin relative to the bent bar. The bent bar generally comprises at least one bent portion and at least one straight portion. The articulated roller is designed to be fitted over the bent portion of the bar to be positioned on the at least one straight portion of the bar where it spins freely. The articulated rollers comprise a series of cylindrical rigid bushings surrounded by a flexible, deformable sleeve. The bushings have an inner diameter and length such that the articulated roller can be fitted over the bent portion of the bar. In some examples, the inner diameter and length of the bushings are a function of the outer diameter of the bent bar and the radius of the bend in the bent portion of the bar.

In one aspect, the present invention relates to an articulated roller assembly for a vehicle roof rack, comprising a V-shaped rack comprising at least two bent bars each having a bent portion and a straight portion, wherein the distal end of each base portion is attached to a base. The assembly comprises at least one articulated roller comprising a plurality of cylindrical bushings surrounded by a sleeve. The cylindrical bushings have an inner diameter and length and the articulated roller is configured to rotate around a portion of one of the at least two bent bars. The inner diameter and length of the cylindrical bushings are such that the articulated roller can fit over the bent portion of the bent bars.

In another aspect, the invention relates to an articulated roller assembly for a bent bar comprising at least one cylindrical bent bar having at least one bent portion and at least one straight portion, wherein the bent bar has an outer diameter; and an articulated roller comprising a plurality of cylindrical bushings surrounded by a sleeve, wherein each cylindrical bushing has an inner diameter. The articulated roller is positioned on the bent bar such that the plurality of cylindrical bushings are positioned around a portion of the bent bar. The inner diameter of the cylindrical bushings is between about 0.5% and about 10% larger than the outer diameter of the bent bar. The articulated roller is configured to rotate around the bent bar.

In still another aspect, the invention relates to an articulated roller assembly for a bent bar, comprising a bent bar comprising a bent portion having a bend radius, wherein the bent bar is circular and has an outer diameter, and an articulated roller configured to be positioned around a portion of the bent bar, the articulated roller comprising a plurality of cylindrical bushings surrounded by a sleeve, wherein each cylindrical bushing has an inner diameter and a length; and wherein the articulated roller is configured to fit around the bend portion of the bent bar. The bend radius of the bent portion is around twice the outer diameter of the bent bar. The length of the cylindrical bushings is between about the outer diameter of the bent bar and one-third the outer diameter of the bent bar.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1 is a perspective view of an articulated roller assembly for a bent bar according to an example embodiment of the present invention.

FIG. 2 is a front view of the articulated roller assembly of FIG. 1.

FIG. 8 is a perspective view of an articulated roller assembly for a bent bar according to another example embodiment of the present invention.

DETAILED DESCRIPTION OF EXAMPLE EMBODIMENTS

Figure 3A:
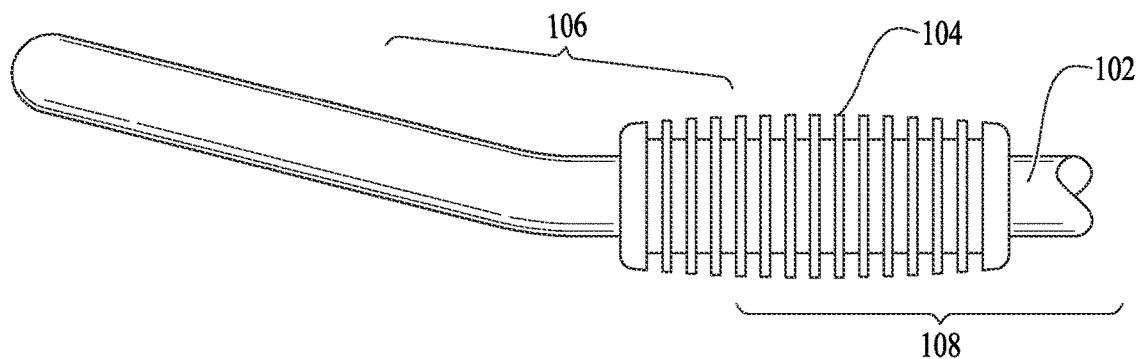
FIGS. 3A-3C show the assembly of the articulated roller onto the bent bar of the articulated roller assembly of FIG. 1.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-7 show an articulated roller assembly 100 according to an example embodiment of the claimed invention. The articulated roller assembly 100 generally includes a bent bar 102 and a plurality of articulated rollers 104 positioned on the bent bar. The bent bar 102 generally includes a bent portion 106 and a plurality of straight portions 108. The articulated rollers 104 are configured to be positioned on the straight portions 108 of the bent bar 102 and to spin when subject to a lateral force. An example of lateral force is a kayak or SUP being positioned on the articulated rollers and pushed laterally onto a roof rack.

The bent portion 106 of the bent bar 102 has a radius R, as shown in FIG. 2. The radius R1 of the bent portion can be dependent on the application for which the bent bar 102 is intended. In some examples, the bent portion 106 of the tube has a constant radius R. In other examples, the radius of the bent portion 106 of the tube can vary. In some examples, the radius R of the bent portion 106 is between about 8 mm and 100 mm. In other examples, the radius R is between about 16 mm and 100 mm. In another example, the radius R is between about 30 mm and about 60 mm. The bend in the bent bar can be in-plane or out-plane. In some examples, the bend can extend up to 220°. In other examples, the bent portion of the bar can resemble a coil and turn multiple times.

The bent bar 102 can be formed of metal such as steel, stainless steel, aluminum, brass, or copper. The bent bar 102 can be formed using methods such as compression bending or draw bending. In other examples, the bent bar 102 can be formed from plastic or another rigid material. The bent bar 102 is generally a circular shape having an outer diameter OD. In some examples, the bent bar 102 is solid. In other examples, the bent bar 102 is a tube having a wall and being hollow in the center. In such examples, the bar 102 may have a wall thickness of between about 1 mm and about 3 mm. The bent bar 102 can include a coating on its exterior surface to improve the assembly's function and longevity. For example, the coating can protect against wear and tear or corrosion. In other examples, a coating can be added for cosmetic effect.

In some examples, the outer diameter OD of the bent bar 102 is between around 4 mm and 50 mm. In other examples, the outer diameter OD of the bent bar 102 is between around 8 mm and 50 mm. In other examples, the outer diameter OD of the bent bar 102 is between about 15 mm and 30 mm. The ratio of the radius of the bend R to the outer diameter OD of the bar 102 is known as the bend multiplier M. In some examples, the bend multiplier M is around 2. In other words, the radius R of the bent portion 106 of the bent bar 102 is around two times its outer diameter OD. In other examples, the bend multiplier is larger or smaller than 2.

Figure 3B:
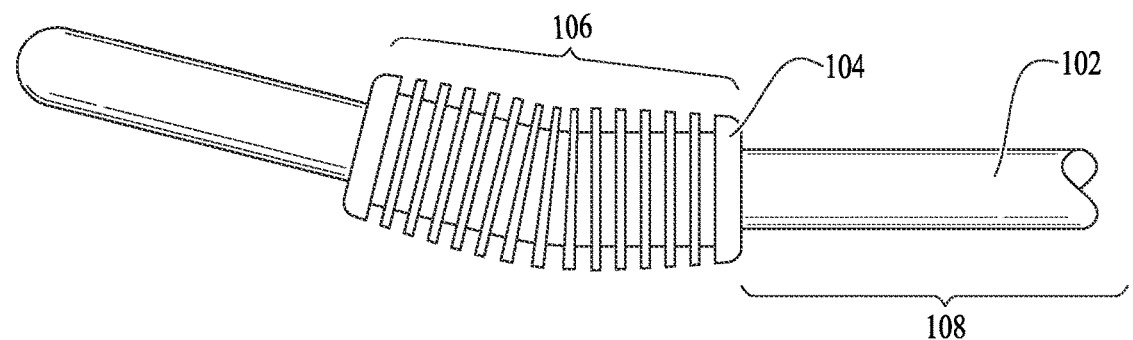
Figure 3C:
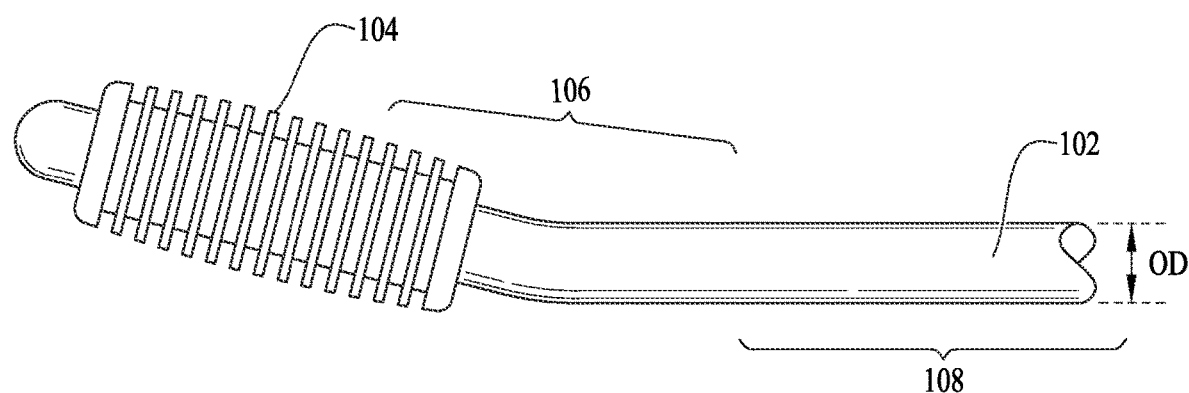
Figure 4:
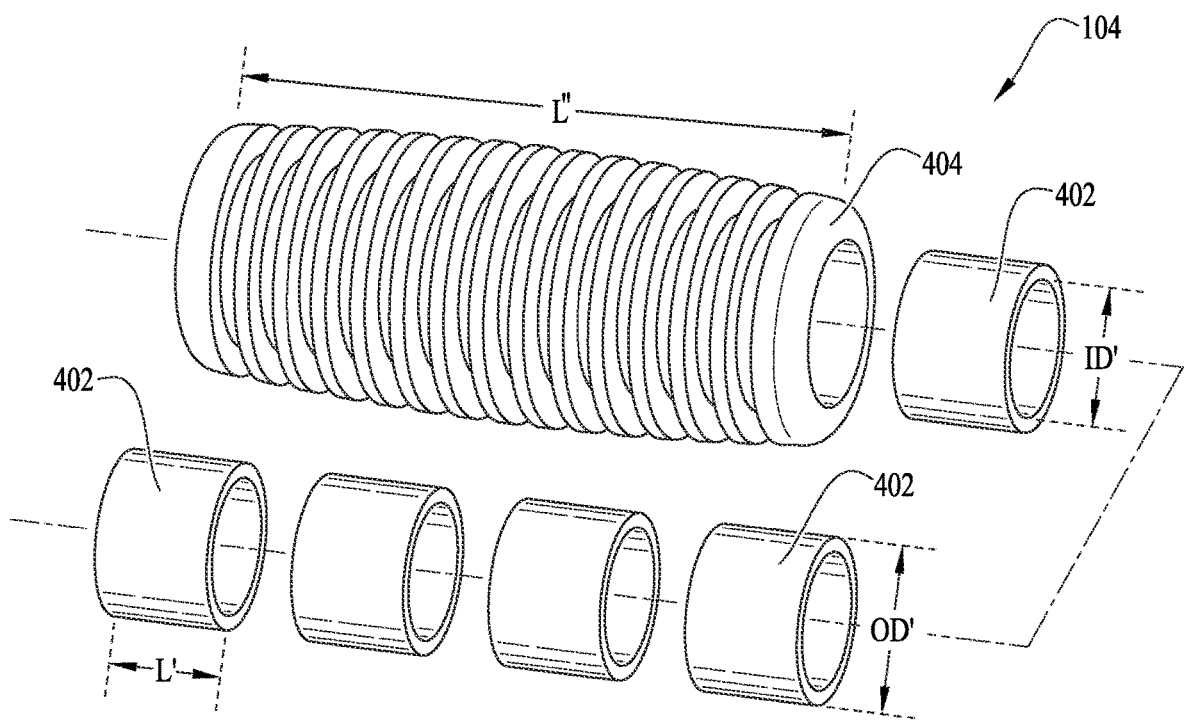
FIG. 4 is an exploded view of an articulated roller of the articulated roller assembly of FIG. 1.
Figure 5:
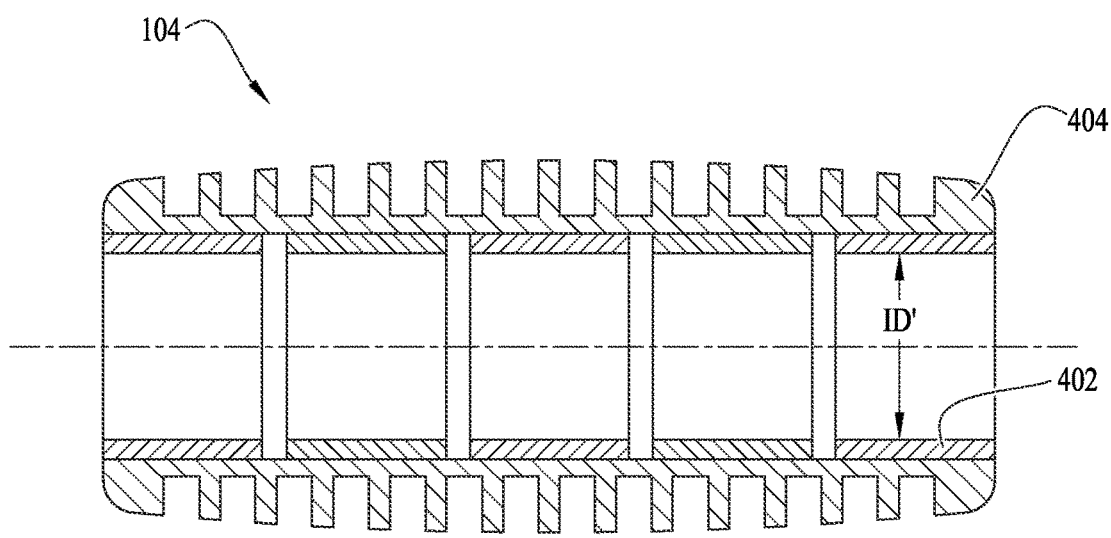
FIG. 5 is a cross-sectional view of the articulated roller of FIG. 4.
Figure 6:
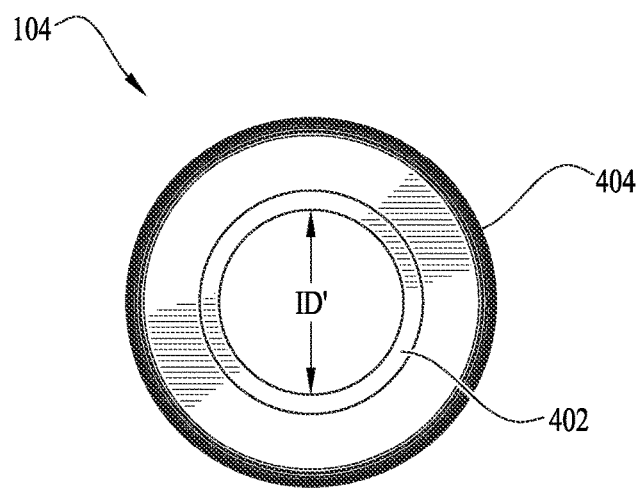
FIG. 6 is a side view of the articulated roller of FIG. 4.

The articulated rollers 104 are configured such that they can be fitted over the bent portion 106 of the bent bar 102, as shown in FIGS. 3A-3C. The articulated rollers 104 generally comprise a plurality of cylindrical bushings 402 surrounded by a sleeve 404, as shown in FIGS. 4-5. The bushings 402 are configured to fit within the sleeve 404 such that the bushings 402 are covered by the sleeve. In some examples, the sleeve 404 does not rotate relative to the bushings 404. The bushings 402 and sleeve 404 can be dimensioned such that the sleeve fits snuggly around the bushings and is unable to rotate. In other words, the inner diameter of the sleeve 404 is approximately equal to the outer diameter of the bushing 402. In other examples, the bushings 402 can be attached to the sleeve 404 using an adhesive or other attachment method. In other examples, the inner diameter of the sleeve 404 is larger than the outer diameter of the bushings 402 such that the sleeve may rotate independently of the bushings.

The bushings 402 are cylindrical such that they have an inner diameter ID', and outer diameter OD', and wall thickness W. The bushings also have a length L'. The bushings 402 are generally formed from a rigid material such as a plastic. For example, the bushings 402 can be formed from a thermoplastic, thermoset plastic, or polymer material. Example materials include without limitation polycaprolactam, polypropylene, polyethylene, high-density polyethylene, polyamide, or some combination thereof. In other examples, the bushings 402 can be formed from a composite material with reinforcement such as carbon fiber. Other rigid materials can be used to create the bushings. For example, the bushings can be made of a metal material such as brass or steel. The bushing material can have a range of modulus of about 1 GPa to about 6 GPa. When a reinforcement is added, the modulus can be significantly higher. For example, the bushing material can have a modulus of at least 15 GPa. When the bushing is made of a metal material, it can have a higher modulus such as from about 50 GPa to about 200 GPa.

In some examples, the length L' of the bushings 402 is between about 3 mm and about 50 mm. In other examples, the length L' of the bushings 402 is between about 8 mm and about 24 mm. In other examples, the length L' of the bushings 402 is between about 3 mm and about 6 mm. In other examples, the length L' of the bushings 402 is between about 20 mm and about 50 mm. The wall thickness W of the bushings can be around 1 mm. In other examples, the wall thickness W of the bushings can be smaller than 1 mm.

Figure 7:
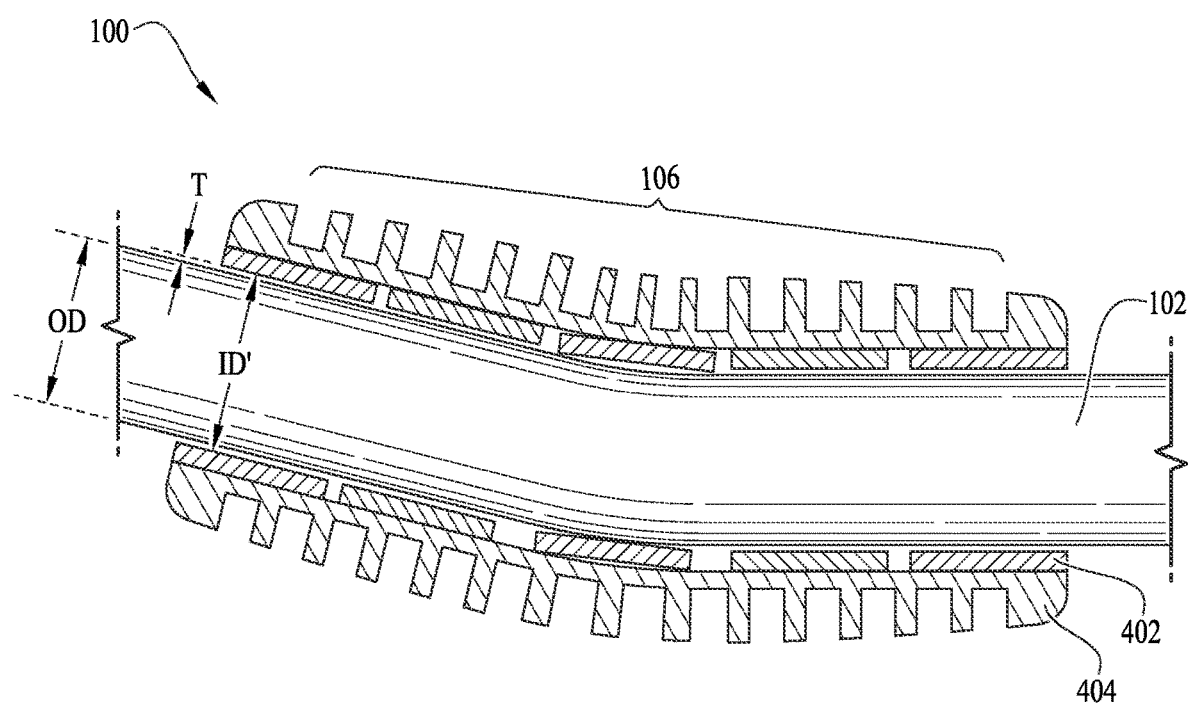
FIG. 7 is a cross-section view of the articulated roller of FIG. 4 being installed on a bent bar.

The articulated roller 104 is dimensioned such that there is a gap or tolerance T between the outer diameter OD of the bar 102 and the inner diameter ID' of the bushing 402. The tolerance T is configured to allow the articulated roller 104 to fit around the bent portion 106 of the bar, as shown in FIG. 7. In some examples, the inner diameter ID' of the bushing 402 is between 1% and 10% larger than the outer diameter OD of the bar 102 to provide the necessary tolerance T. In other embodiments, the necessary tolerance T is a function of the outer diameter OD and bend radius R of the bar 102 and the length L of the bushing. For, example the tolerance can be calculated using the following formula:

$$T = \frac{OD(2M-1) + \sqrt{OD^2(2M-1)^2 - L'^2}}{2}$$

The number of bushings 402 in each articulated roller 102 is dependent on the length L' of the bushings relative to the length of the sleeve, as explained further below. In some examples, the articulated roller 102 has at least two bushings 402. In other examples, the articulated roller 102 has at least 6 bushings 402. In other examples, each articulated roller 102 has more than 10 bushings 402.

The sleeve 404 covers a plurality of bushings 402. In some examples, the aggregate length of the plurality of bushings 402 is equal to the length L" of the sleeve. In another example, the length L" of the sleeve 404 is greater than the of the bushings 402. For example, the aggregate length of the bushings can be between 50% and 99.5% of the length L" of the sleeve. In other examples, the aggregate length of the bushings 402 is between about 95% and 100% of the length of the sleeve 404. In some examples, the length L" of the sleeve 404 is around 95 mm. In other examples, the sleeve can be shorter or longer. In other examples, the aggregate length of the bushings 402 can be longer than the length L" of the sleeve 404 such that the bushings extend beyond the ends of the sleeve.

The sleeve can be formed from a flexible material such as urethane, thermoplastic rubbers, foam, honeycomb materials, and thermoplastic elastomers. The sleeve material may have a durometer range of about Shore 30A to about Shore 90A. The sleeve may be created using injection molding or other known methods. In some examples, the outer surface of the sleeve 404 can be flat, having a constant outer diameter. In other examples, the outer surface of the sleeve 404 can have a surface treatment such as ridges, shown in the Figures, or a texture. The surface treatment can allow for gripping of the cargo being loaded onto the articulated roller 102. In some examples, the outer diameter of the sleeve can vary over its length. For example, the outer surface of the sleeve can be thicker in the center than at the ends, thicker at the ends than in the center, or can comprise a series of peaks.

FIG. 8 shows another example articulated roller assembly 800 for a bent bar 802. The bent bar 802 can include at least a first bar 804 and a second bar 806. Each bar 804, 806 includes a bent portion and is connected at a distal end to a base 814. In some examples, the second bar 806 can include a plurality of articulated rollers 810 configured to rotate about an axis parallel to the longitudinal length of the bar. The first bar 804 may include flexible coverings 808 that are not configured to rotate about the first bar. In use, a watercraft or other cargo can be placed against the articulated rollers 810 on the second bar 806 at an angle and pushed upward and forward, rolling the articulated rollers. Once the cargo is moved into position, it is rested on top of the stationary coverings 808 on the first bar 804. This configuration allows for ease of loading cargo onto a vehicle roof rack while also providing grip to prevent the cargo from sliding off in transit. In example embodiments, the articulated roller assembly includes a visual indicator 812 to indicate to a user which bar has the articulated rollers 810 and which bar has the stationary covers 808. The visual indicator 812 can be, for example, a plastic collar of a distinct color. In other examples, the visual indicator can be writing printed on the bar itself. The visual indicator can be placed on either the first or second bar.

While the invention has been described with reference to example embodiments, it will be understood by those skilled in the art that a variety of modifications, additions and deletions are within the scope of the invention, as defined by the following claims. For example, while the articulated rollers have been described with respect to a roof rack for a vehicle, a person of ordinary skill in the art would understand that the articulated roller assembly described herein could have other applications include on conveyor lines, luggage racks, manufacturing system, etc.

What is claimed is:

1. An articulated roller assembly for a vehicle roof rack, comprising:
   a V-shaped rack comprising at least two bent bars each having a bent portion and a straight portion, wherein the distal end of each base portion is attached to a base;
   at least one articulated roller comprising a plurality of cylindrical bushings surrounded by a sleeve, wherein the cylindrical bushings have an inner diameter and length and wherein the articulated roller is configured to rotate around a straight portion of one of the at least two bent bars;
   wherein the inner diameter and length of the cylindrical bushings are such that the articulated roller can fit over the bent portion of the bent bars.

2. The articulated roller assembly of claim 1, wherein the base portion is configured to be removably mounted to a crossbar of the vehicle such that the bent bars extend in a direction perpendicular to a direction of travel of the vehicle and wherein the at least one articulated roller rotates about an axis transverse to the direction of travel of the vehicle.

3. The articulated roller assembly of claim 1, wherein the cylindrical bushings are formed of a rigid material including a thermoplastic or thermoset plastic material.

4. The articulated roller assembly of claim 1, wherein the sleeve is formed of a flexible material including urethane or thermoplastic rubbers.

5. The articulated roller assembly of claim 1, wherein the at least two bent bars comprises a first bent bar and a second bent bar, wherein the first bent bar comprises a plurality of articulated rollers configured to rotate about the bent bar, wherein the second bent bar includes a flexible covering that is not configured to rotate about the bent bar.

6. The articulated roller assembly of claim 5, wherein one of the first bent bar or the second bent bar comprises a visual indicator to distinguish it from the other bent bar.

7. An articulated roller assembly for a bent bar, comprising:
   at least one cylindrical bent bar having at least one bent portion and at least one straight portion, wherein the bent bar has an outer diameter; and
   an articulated roller comprising a plurality of cylindrical bushings surrounded by a sleeve, wherein each cylindrical bushing has an inner diameter;
   wherein the articulated roller is positioned on the bent bar such that the plurality of cylindrical bushings are positioned around a portion of the bent bar;
   wherein the inner diameter of the cylindrical bushings is between about 0.5% and about 10% larger than the outer diameter of the bent bar; and
   wherein the articulated roller is configured to rotate around the bent bar.

8. The articulated roller assembly of claim 7, wherein the outer diameter of the bent bar is between about 4 mm and about 50 mm.

9. The articulated roller assembly of claim 7, wherein the outer diameter of the bent bar is between about 15 mm and about 30 mm.

10. The articulated roller assembly of claim 7, wherein the articulated roller is positioned around the at least one bent portion of the bent bar such that it rotates about the bent portion of the bent bar.

11. The articulated roller assembly of claim 7, wherein the articulated roller comprises at least three cylindrical bushings.

12. The articulated roller assembly of claim 7, wherein the cylindrical bushings have a thickness of at least 1 mm.

13. The articulated roller assembly of claim 7, wherein the outer surface of the sleeve comprises a surface treatment.

14. An articulated roller assembly for a bent bar, comprising:
   a bent bar comprising a bent portion having a bend radius, wherein the bent bar is circular and has an outer diameter;
   an articulated roller configured to be positioned around a portion of the bent bar, the articulated roller comprising a plurality of cylindrical bushings surrounded by a sleeve, wherein each cylindrical bushing has an inner diameter and a length; and wherein the articulated roller is configured to fit around the bend portion of the bent bar; and
   wherein the bend radius of the bent portion is around twice the outer diameter of the bent bar; and
   wherein the length of the cylindrical bushings is between about the outer diameter of the bent bar and one-third the outer diameter of the bent bar.

15. The articulated roller assembly of claim 14, wherein the length of the cylindrical bushings is between about 3 mm and about 50 mm.

16. The articulated roller assembly of claim 14, wherein the length of the cylindrical bushings is between about 8 mm and about 24 mm.

17. The articulated roller assembly of claim 14, wherein the sleeve has a length, and wherein the length of the sleeve is larger than the cumulative length of the cylindrical bushings.

18. The articulated roller assembly of claim 14, wherein the radius of the bent portion of the bent bar is between 8 mm and 100 mm.

19. The articulated roller assembly of claim 14, wherein the radius of the bent portion of the bent bar is between 30 mm and 60 mm.

20. The articulated roller assembly of claim 14, wherein the bent tube is formed from one of steel, stainless steel, aluminum, brass or copper.

\* \* \* \* \*